(12) United States Patent  
Cimmino

(10) Patent No.: US 6,725,729 B1  
(45) Date of Patent: Apr. 27, 2004

(54) ELECTRONIC TRANSDUCER FOR MEASURING FLEXION

(76) Inventor: Alberto Cimmino, 7 Wallen St., East Brighton Vic 3187 (AU)

(*) Notice: Subject to any disclaimer, the term of this patent is extended or adjusted under 35 U.S.C. 154(b) by 0 days.

(21) Appl. No.: 10/018,693

(22) PCT Filed: Apr. 27, 2000

(86) PCT No.: PCT/AU00/00383

§ 371 (c)(1),  
(2), (4) Date: Apr. 16, 2002

(87) PCT Pub. No.: WO00/66970

PCT Pub. Date: Nov. 9, 2000

(30) Foreign Application Priority Data

Apr. 29, 1999 (AU) .............................................. PQ0047

(51) Int. Cl.[7] ................................................. G01N 3/20
(52) U.S. Cl. ...................................................... 73/849
(58) Field of Search ...................... 73/862.391, 862.42, 73/862.452, 862.46, 856, 849

(56) References Cited

U.S. PATENT DOCUMENTS

| | | | |
|---|---|---|---|
| 2,564,416 A | * | 8/1951 | Wildhack ..................... 73/774 |
| 4,378,504 A | * | 3/1983 | Yamasaki ..................... 307/99 |
| 4,386,386 A | * | 5/1983 | Akita ....................... 361/283.1 |
| 4,526,177 A | * | 7/1985 | Rudy et al. ................. 600/550 |
| 5,024,089 A | * | 6/1991 | Norling .................... 73/514.23 |
| 5,090,248 A | * | 2/1992 | Cimmino et al. ............. 73/780 |

FOREIGN PATENT DOCUMENTS

WO     WO 85/01346    * 3/1985

* cited by examiner

*Primary Examiner*—Max Noori  
(74) *Attorney, Agent, or Firm*—Andrus, Sceales, Starke & Sawall, LLP

(57) ABSTRACT

An electronic flexion transducer (10) comprises a helical coil formed from two interposed electrical conductors (A) and (B) which are electrically isolated from each other either by an insulated coating on the conductors or by being embedded in a dielectric material (11) having a substantial elasticity. The coil is bonded along one side over its entire length to a flexible non-extensible support surface (13) whereby flexion of the support surface causes a change in the length of the coil between said one side, which retains its original length, and a side opposite to said one side, which either increases or decreases in length. This relative change in length between opposite sides causes angular separation between adjacent turns of the coil and since adjacent turns represent respective conductors (A) and (B) there is a change in capacitance between the respective conductors which can be used to provide an electrical signal to a computer to record and display the change. A puppeteer's glove incorporating said transducer in each finger is also described.

17 Claims, 4 Drawing Sheets

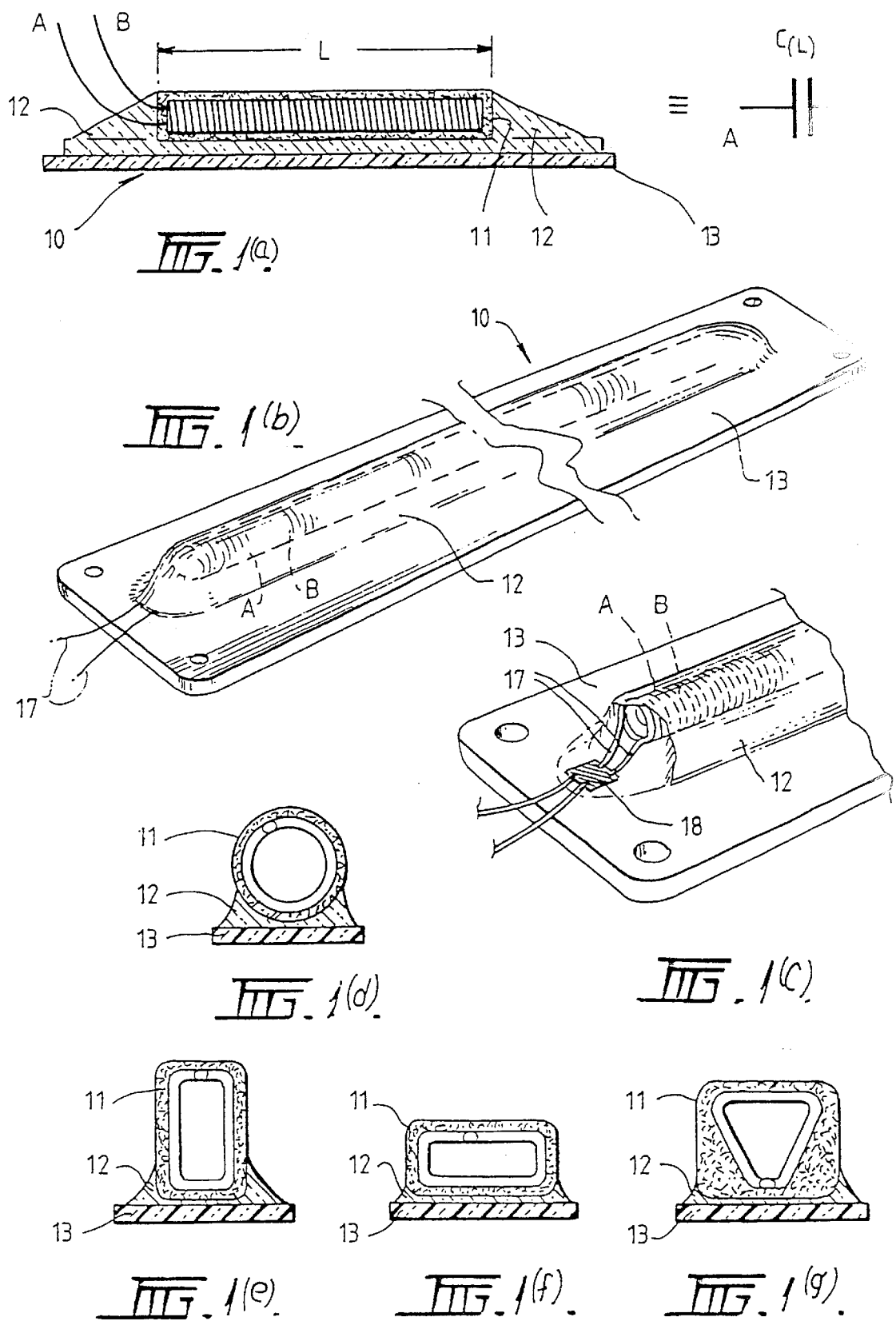

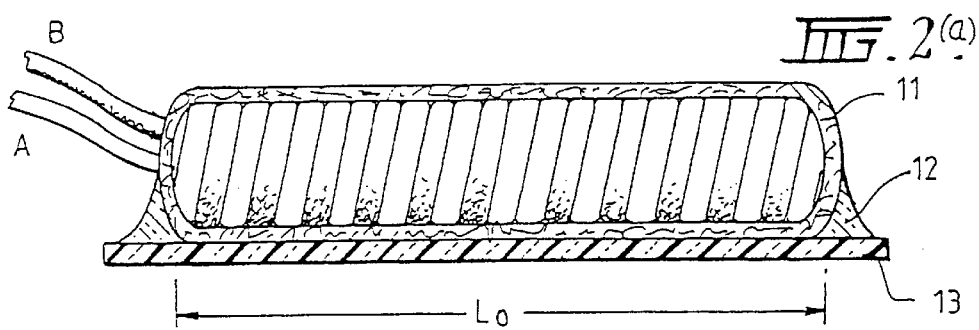
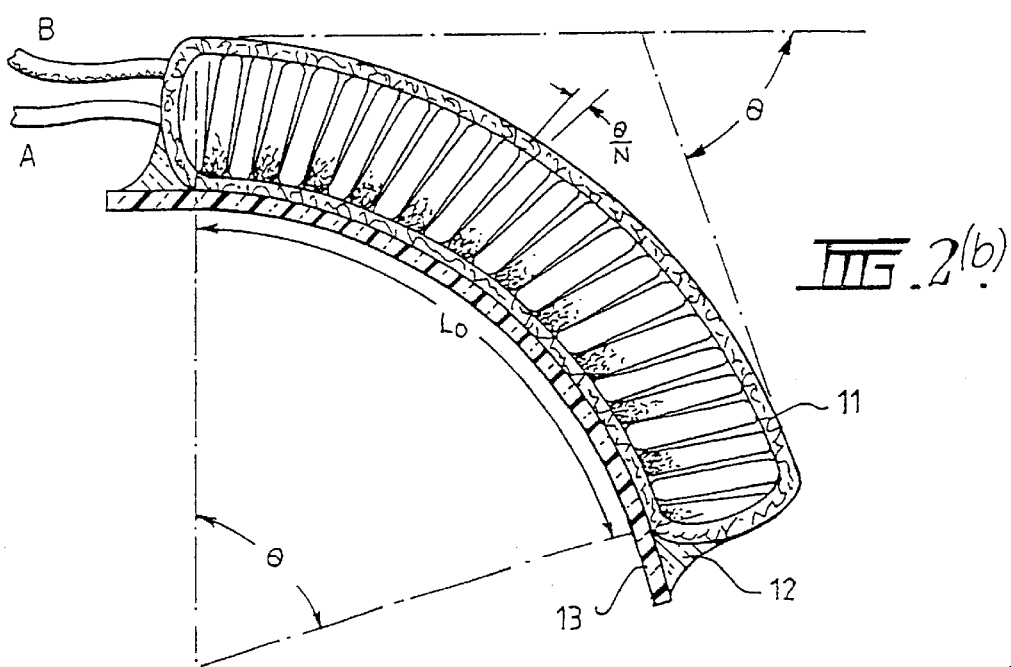
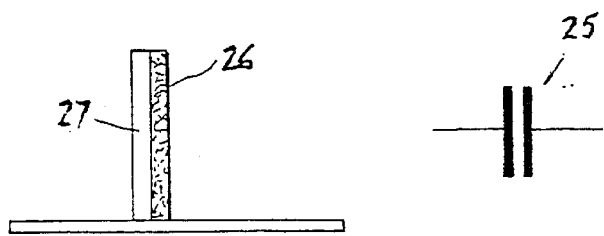
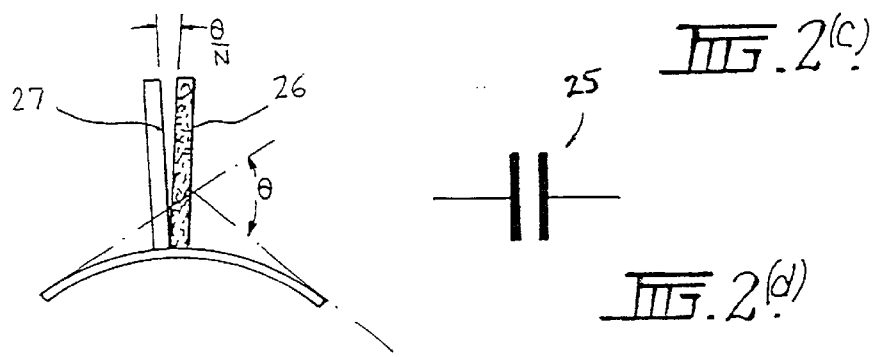

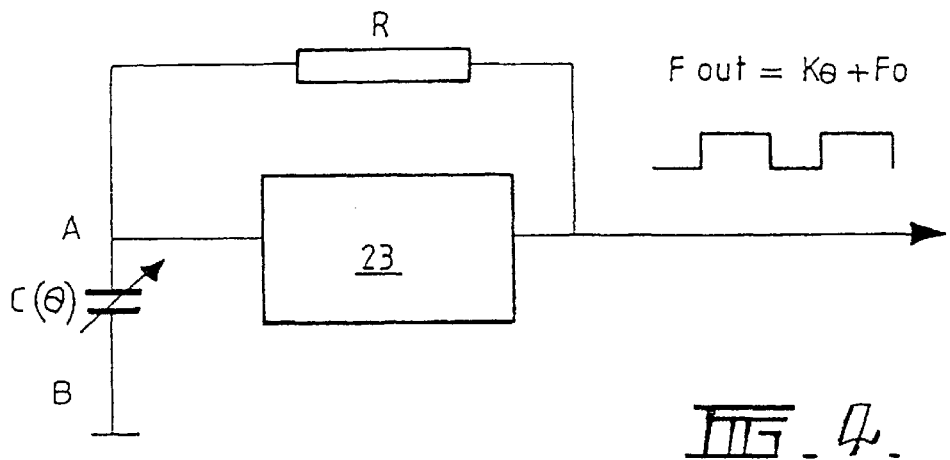
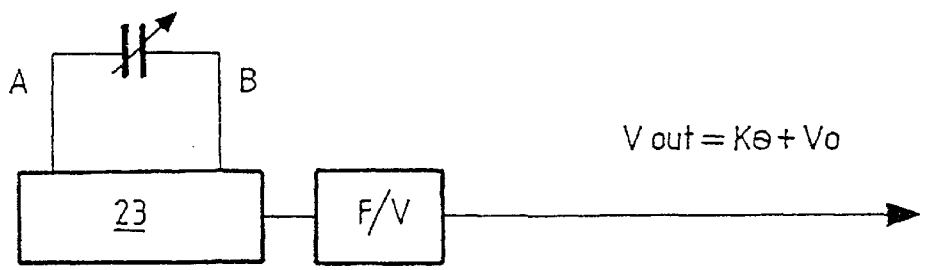
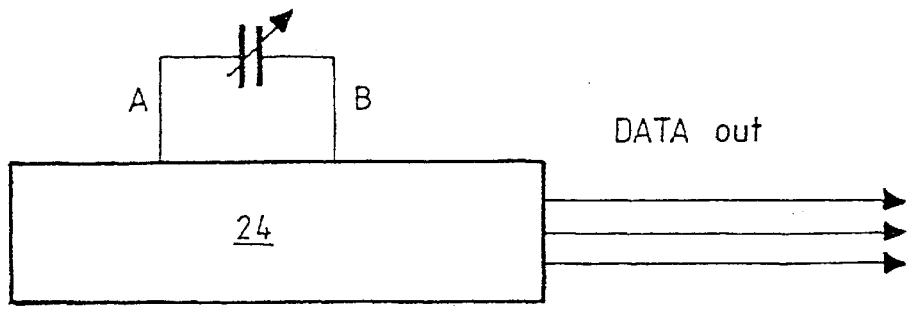
FIG. 5.

ELECTRONIC TRANSDUCER FOR MEASURING FLEXION

CROSS REFERENCE TO RELATED APPLICATION

The present application is the U.S. national stage application of International Application PCT/AU00/00383, filed Apr. 27, 2000, which international application was published on Nov. 9, 2000 as International Publication WO 00/66970 in the English language. The International Application claims priority of Australian Patent Application PQ 0047, filed Apr. 29, 1999.

SUMMARY OF THE INVENTION

The present invention relates to an electronic transducer for measuring flexion of bodies or structures and particularly bodies or structures which are soft or elastic and which may be subject to length variations during flexion. The invention has particular utility in the measurement of flexion of joints in the human body without introducing constraints but it will be apparent that the invention has wide application and is in no way limited to this particular purpose.

In one practical embodiment of the invention transducers according to the invention are mounted in or on the fingers of a glove whereby human finger motion is converted to data streams for input to a computer. Such a glove is used in professional animation production by Puppeteers.

One prior art transducer device in the form of a Puppeteer's glove uses fibre-optic cables that circumscribe each finger of the glove through pre-sewn channels and transmit light from Light Emitting Diodes (LED's) at one end of the cable to photo receptors at the other end of the cable. The variation in bending of the fibre-optic cable causes a variation in the light received by the receptor and thus flexion of the fingers is able to create data streams related thereto. A number of problems are inherent in these prior art devices. For example, the fibre-optic cables required for the purpose are communication grade cables which are expensive and, although flexible, are not designed for continuous flexion and consequently they have a short life span. Other problems such as connecting power to the glove and the electronic circuit components required for implementation render the gloves cumbersome and expensive to repair.

A further prior art device is described in U.S. Pat. No. 5,090,248 entitled "Electronic Transducer" and comprises an extensometer in the form of two or more interposed helical coils configured to allow elastic deformation thereof and preferably mounted in an elastic dielectric material which provides a restoring force to return the conductors to their original configuration after deformation. The deformation causes a change in the capacitance between the conductors (by changing the inter-electrode gap between the respective coils) and this change is monitored to measure dimensional change over a wide dynamic range. The dimensional change is essentially elongation or when the extensometer is attached to a movable joint is a combination of elongation and deflection which cannot be separated since the change in capacitance is a measure of the changes in inter-electrode's gap due to both elongation and deflection. Therefore this prior art transducer is not suitable for measuring angular deflections reliably or accurately as would be required, for example, in the aforementioned Puppeteer's glove or in any other situations where accurate and reproducible data is required.

BRIEF DESCRIPTION OF THE INVENTION

Accordingly, it is an object of this invention to provide an electronic flexion transducer that overcomes one or more of the aforementioned problems, or other problems, associated with known transducers when used for measuring or monitoring flexion.

The invention provides an electronic flexion transducer comprising two or more interposed electrical conductors forming an elongate coil, said coil being bonded on one side along its length to a flexible non-extensible support surface whereby flexion of the surface causes a change in length of the coil between said one side, which retains its original length and a side opposite to said one side, thereby causing an angular separation between said conductors with a consequent change in capacitance of the coil.

BRIEF DESCRIPTION OF THE DRAWING

In order that the invention may be more readily understood a particular embodiment will now be described with reference to the accompanying drawings wherein:

FIG. 1(a) is a sectional side view of a flexion transducer according to the invention;

FIG. 1(b) is a perspective view from above of a flexion transducer according to the invention and as depicted in FIG. 1(a);

FIG. 1(c) is an enlarged view of an end portion of the transducer of FIG. 1(b);

FIGS. 1(d), (e), (f) and (g) show several alternative cross sections of the transducer core windings of the transducer shown in FIG. 1(a);

FIGS. 2(a) and (b) are similar to FIG. 1(a) but shows the transducer in a relaxed and flexed state respectively;

FIGS. 2(c) and (d) represent a pair of adjacent turns of the coils of the transducer in the relaxed and flexed state shown as their equivalent capacitances symbolised as parallel plate capacitors with different gaps;

FIG. 4 is a schematic block diagram of a general oscillator circuit for producing a digital and analog data output from a varying capacitance.

FIG. 5 is a circuit diagram similar to FIG. 4 when applied to the transducer of this embodiment.

DETAILED DESCRIPTION OF THE INVENTION

Figure 3:
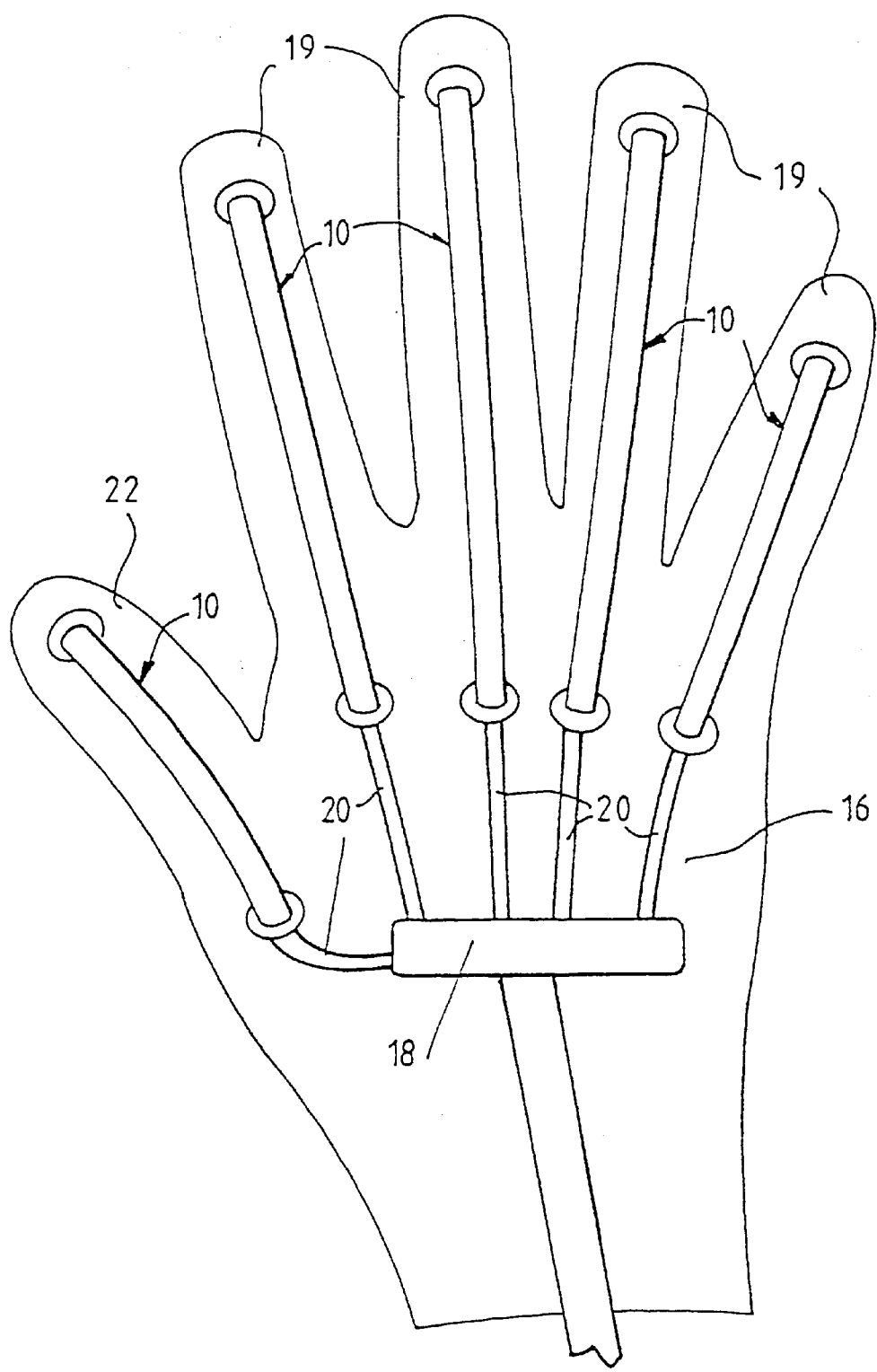
FIG. 3 is a schematic view of the back of a glove showing transducers according to the invention mounted on each finger and the thumb of the glove.

The flexion transducer 10 is shown in the drawings to comprise a pair of coaxial interposed helical conductors A and B embedded in an elastic dielectric material 11 and to this point may be identical to the transducer disclosed in U.S. Pat. No. 5,090,248. The transducer may be formed by winding the two conductors A and B as a bifilar coil over a mandrel (not shown) to form an elongate helical coil. The mandrel is then withdrawn and the coil is either embedded in dielectric material 11 having a substantial elasticity or coated with said dielectric material. In either case the respective conductors are electrically isolated from each other.

After formation of the embedded or coated conductors A and B has been completed, the transducer is bonded on one side along its length to a flexible non-extensible base surface 13 which extends along the entire length of the transducer. The bonding is achieved by means of a flexible adhesive 12 such as silicon elastomer. The ends 17 of the respective conductors A, B extend out from the dielectric material to a termination block 18 FIG. 1(c) for interconnection to transducer read-out circuitry to be described hereinbelow. As is shown in FIG. 1(a), there is an equivalent capacitance CL between the coils of the conductors A and B.

Referring to FIG. 2(b) the transducer is shown in a flexed state in which case the side of the embedded coil that is attached to the support surface 13 remains at the same length as the undistorted transducer (represented by Lo in this Figure) whereas the opposite side of the coil stretches due to the larger radius of curvature. The net result is that the respective turns or loops of the conductors A and B separate on the outer side of the flexed transducer.

The sum of the angular separations between adjacent turns is equal to the flexion of the transducer defined as the angle formed by the tangents to the transducer arc at the two ends.

FIGS. 2(c) and (d) show adjacent loops 26 & 27 respectively of the respective conductors A and B in the relaxed or non-flexed state and in the flexed state with the respective equivalent capacitances 25 symbolised as parallel plate capacitor with different gaps.

The capacitance between the respective conductors A and B changes when the transducer is flexed but the length of the transducer, at least along the edge attached to the support surface 13 does not change.

The change in capacitance between the respective conductors A and B is a convenient measure of flexion and can easily be calibrated with the help of a goniometer attached to the two end of the transducer.

FIGS. 1(e), (f) and (g) show different cross sections which can be obtained by deformation of the circular cross-section shown in FIG. 1(d) or by directly forming over a mandrel of appropriate cross-section. The advantage of using cross-section as shown in FIGS. 1(e) and (g) over the circular cross-section of the same perimeter is that more of the respective electrodes A and B are at a larger radius of curvature and therefore result in a larger change of capacitance for the same flexion, thereby increasing the transducer inherent sensitivity.

The transducer of FIGS. 1 and 2 can be attached to a stretch fabric (not shown) by means of adhesive or by stitching which is applied at each end of the transducer or alternatively along the entire length thereof. The fabric may be stretch fabric forming part of a glove 16 as shown in FIG. 3. In such a case, the transducer is attached along a finger 19 or thumb 22 of the glove, so as to be on the back of the user's hand when the glove is worn. In an alternative embodiment the transducers are attached on the palm side of the glove. A separate transducer 10 is attached along each finger and the thumb of the glove 16 although more than one transducer may be attached on each. In a further alternative embodiment of a puppeteer's glove (not shown) a separate transducer may extend over each knuckle joint of each finger or only over one or more of the knuckle joints. Electrical wires 20 extend from each transducer read-out circuitry to a termination block 18 so that external circuitry may be connected to the respective conductors of each transducer.

As will be evident, the relative change in length between the two sides of the transducer causes an angular separation between the coils or turns of the conductors A and B. This angular separation produces a change in the capacitance of the transducer which is directly related to the flexion of the support surface 13. With appropriate calibration, the angle of flexion, or joint rotation, can be accurately derived from the measured change in capacitance. One embodiment of a transducer read-out circuit will now be described with reference to FIGS. 4 and 5. The transducer capacitance $C(\theta)$ is arranged to be the timing capacitance of an oscillator 23 such as a C-Mos 555 in the astable configuration as shown in FIG. 4. Flexing of the transducer modulates the output frequency of the oscillator.

For a parallel plate capacitor the capacitance is expressed by the relation $$C = \theta S/(d + do)$$

where S is the effective area of the electrodes, d is the variable distance between them and do is the fixed minimum separation due, for example, to the thickness of insulation of the electrodes wires.

The same expression applies to the capacitance of the transducer in the flexed state where S represents the effective area of the electrodes A and B and d is the equivalent separation which is to good approximation a linear function of the flexion angle $\theta$, $(d = k\theta)$ as can be easily inferred from FIGS. 2(b)–2(d).

The capacitance of the transducer is therefore to good approximation $$C(\theta) = \theta S/(k\theta + do).$$

The output frequency of the oscillator 23 is given by $$Fout = a/RC$$

Where a is a circuit constant and R the feedback resistance.

Substituting in the above relation the expression of the transducer capacitance as function of flexion results in an essentially linear dependence of the output frequency as function of flexion:

$$Fout = K\theta + Fo$$

The parallel plate capacitor with variable gap is most sensitive to changes in separation at small gaps.

The effective gap of the transducer even for very large flexion is always very small, thereby assuring operation in the most sensitive region of its transfer characteristic, unlike the aforementioned transducer disclosed in U.S. Pat. No. 5,090,248.

The output frequency Fout can be converted into an analogue current or voltage using simple circuitry (FIG. 5). A micro-controller 24 is used to perform all functions required to convert the changes in capacitance, into a form easily displayed and readable by an external instrument or computer. The oscillator or micro-controller 24 is incorporated in the termination block 18 directly at one end of the transducer coils to minimise stray capacitances and to facilitate connection to external devices (see FIG. 1(c)). Examples of the oscillator or micro-controller circuit are shown in FIG. 5.

A transducer such as that disclosed in aforementioned U.S. Pat. No. 5,090,248 would not work in a situation measuring flexion angle or joint rotation since it would be subject to both elongation and deflection which, in analysing the result, cannot be separated. The change in capacitance with this prior art transducer is a measure of the changes of inter-electrodes gap due to both elongation and angular deflection. With the transducer of the present invention, angular deflections only are transferred to the electronic transducer, via the flexible non-extensible support. The support surface 13 is attached to the body or joint in a way that facilitates possible length changes in the body itself. In other words, the elastic material of glove 16 may change in length over the finger portion but the support surface 13 prevents a like change in length of the transducer 10. Since the flexion is transmitted to the transducers via the flexible non-extensible supports, exact positioning is not required and the capacitance changes are independent of the size of the hand inside the glove and on shifts of the glove during flexing activity. This results in a reliable and reproducible data entry device for the remote control of computer programs for general devices and instruments. In the case of a puppeteer's glove, it enables accurate monitoring of the flexions of the joints and fingers of the hand and thus provides reliable data for transmission to a remote computer for controlling animations.

Whilst the flexion transducer has been described in a practical embodiment in relation to a glove, it will be evident that it has many other applications and is therefore not limited to this particular purpose. The transducer is suitable for use in any location where flexion is to be measured in an accurate manner.

What is claimed is:

1. An electronic flexion transducer comprising two or more electrically isolated and interposed electrical conductors forming an elongate coil, characterized in that said coil is bonded on one side along its length to a flexible non-extensible support surface whereby flexion of the surface causes a change in length of the coil between said one side, which retains its original length and a side opposite to said one side, thereby causing an angular separation between said conductors with a consequent change in capacitance of the coil.

2. A transducer as defined in claim 1, characterized in that, said coil is enclosed in an elastic dielectric material forming a casing for said coil, said casing being bonded to said support by means of a flexible adhesive.

3. A transducer as defined in claim 2, characterized in that, said coil comprises two said conductors, and appropriate insulated wires are connected to the respective conductors to facilitate monitoring of the change in capacitance due to said flexion whereby, with appropriate calibration, the angle of flexion, or joint rotation, is accurately derived.

4. A transducer as defined in claim 3, characterized in that, the cross-sectional shape of said coils is circular.

5. A transducer as defined in claim 3, characterized in that, the cross-sectional shape of said coil is rectangular, with unequal sides.

6. A transducer as defined in claim 5, characterized in that said one side coincides with a short side of said rectangular coil.

7. A transducer as defined in claim 5, characterized in that said one side coincides with a long side of said rectangular coil.

8. A transducer as defined in claim 3 characterized in that, the cross-sectional shape of said coil is substantially triangular and said one side coincides with an apex of said triangle.

9. A puppeteer's glove, characterized in that, each finger and the thumb of said glove has a transducer as defined in claim 1 extending over one or more knuckle joints.

10. A puppeteer's glove as defined in claim 9, characterized in that, a separate said transducer extends over each said knuckle joint.

11. A puppeteer's glove as defined in claim 9, characterized in that, a single said transducer extends over the three joints of each finger and a further said transducer extends over the thumb joints.

12. A puppeteer's glove as defined in claim 9, characterized in that said transducers are on the back of each finger and the thumb of said glove.

13. A puppeteer's glove as defined in claim 12, characterized in that a read-out circuit including a micro-controller is provided on said glove to receive electrical output from said coil and convert changes in capacitance between the respective conductors into signals readable by an external computer.

14. A puppeteer's glove as defined in claim 10, characterized in that said transducers are on the back of each finger and the thumb of said glove.

15. A puppeteer's glove as defined in claim 11, characterized in that said transducers are on the back of each finger and the thumb of said glove.

16. A puppeteer's glove as defined in claim 14, characterized in that a read-out circuit including a micro-controller is provided on said glove to receive electrical output from said coil and convert changes in capacitance between the respective conductors into signals readable by an external computer.

17. A puppeteer's glove as defined in claim 15, characterized in that a read-out circuit including a micro-controller is provided on said glove to receive electrical output from said coil and convert changes in capacitance between the respective conductors into signals readable by an external computer.

* * * * *